United States Patent [19]

McClelland et al.

[11] Patent Number: 5,692,024
[45] Date of Patent: Nov. 25, 1997

[54] REACTOR PRESSURE VESSEL TOP GUIDE STRUCTURE INSPECTION APPARATUS AND TRANSPORT SYSTEM

[75] Inventors: Richard G. McClelland, Richland; Lawrence R. Fox; Edward J. Ruzauskas, both of Kennewick; Douglas A. Adkisson, Richland, all of Wash.

[73] Assignee: Siemens Power Corporation, Richland, Wash.

[21] Appl. No.: 699,096

[22] Filed: Aug. 16, 1996

[51] Int. Cl.[6] .................................................. G21C 17/00
[52] U.S. Cl. .......................... 376/245; 376/249; 376/252; 73/620
[58] Field of Search .......................... 376/245, 249, 376/252; 165/11.2; 73/628, 641, 620

[56] References Cited

U.S. PATENT DOCUMENTS

| | | | |
|---|---|---|---|
| 4,509,369 | 4/1985 | Kuljis et al. | 376/249 |
| 4,548,785 | 10/1985 | Richardson et al. | 376/249 |
| 4,818,470 | 4/1989 | Richardson et al. | 376/245 |
| 4,826,650 | 5/1989 | Richardson et al. | 376/249 |
| 5,078,954 | 1/1992 | Smith et al. | 376/245 |
| 5,267,481 | 12/1993 | Smith | 376/249 |
| 5,394,345 | 2/1995 | DeBriere et al. | 376/245 |

Primary Examiner—Daniel D. Wasil
Attorney, Agent, or Firm—Ira Lee Zebrak

[57] ABSTRACT

A reactor pressure vessel top guide structure inspection and transport system comprising a remotely operable and positionable underwater vehicle for traversing the top guide structure of a reactor pressure vessel and for positioning an inspection system for detecting defects in the top guide structure.

21 Claims, 11 Drawing Sheets

REACTOR PRESSURE VESSEL TOP GUIDE STRUCTURE INSPECTION APPARATUS AND TRANSPORT SYSTEM

FIELD OF THE INVENTION

The present invention relates generally to an apparatus and method for examining and detecting cracks in the top guide structure of boiling water reactor pressure vessels, and more particularly, for volumetrically inspecting the top guide structure of a fully-loaded boiling water reactor core.

BACKGROUND OF THE INVENTION

Nuclear reactors need to be periodically maintained and inspected as well as refueled. During refueling operations, refueling of the core and related fuel operations are performed, as well as on-site inspection and maintenance within the reactor vessel of reactor pressure vessel internals which are otherwise inaccessible during reactor operations.

Several boiling water reactors have experienced cracks or defects resulting from radiation assisted stress corrosion cracking and intergranular stress corrosion cracking in the reactor pressure vessel top guide structure which serves to align and maintain the upper portion of the fuel assemblies in proper position.

In the past, remote visual examination has been used to locate and characterize these defects. Due to both the construction of the top guide structure which is comprised of two sets of straight parallel grid members which are interconnected to form a lattice of rectangular shaped openings, and the position of the upper ends of the fuel assemblies within these openings, many areas of the top grid structure cannot be accessed or cannot be adequately inspected by visual examination. Areas of the grid members which intersect one another or are underneath one or the other cannot be inspected by visual examination. When cracking or defects occur, the grid members obscure from view the resultant cracks or defects. Areas of the top guide structure which are inaccessible to visual examination have frequently gone uninspected. Even in those limited areas of the top guide structure which can be seen, visual inspection is inherently inadequate to identify defects which are too small to be visually detected. Furthermore, visual examination of even those portions of the top guide structure which can be seen, cannot adequately characterize the depth of a defect which is of equal if not greater importance than identifying the existence of a defect. Even for those areas which can be visually inspected and defects identified, visual inspection cannot be relied upon to provide accurate defect sizing.

Recording the results of visual examination of the plethora of grid members of the top guide structure can be, and frequently is, subject to error due to the difficulty of correlating the presence and location of a defect in a particular grid member to a frame of reference of all the grid members of the top guide structure. Since inspection of the top guide structure has to be performed remotely and underwater, errors due to parallax can significantly impair the accuracy of the results.

In order to inspect even those portions of the top guide structure which can be visually inspected (other than the top edge of the grid members), the nuclear fuel assemblies which are positioned in the openings in the top guide structure have had to be removed. Accordingly, all or at least some of the nuclear fuel assemblies have had to be at least lifted from the reactor core and probably removed from the reactor pressure vessel in order to permit the performance of even a limited visual inspection. In addition, in order to perform visual inspections, the fuel handling machine needs to be continuously available rendering it effectively unavailable for refueling operations or for other purposes even after the fuel assemblies have been removed from the reactor vessel. The need to first remove some or all of the nuclear fuel assemblies from the reactor core or reactor pressure vessel to perform an inspection of the top guide structure involves several days of critical inspection time which can be very costly because of increased refueling outage time.

It would therefore be an advantage and is an object of the present invention to provide a system and method for accessing the top guide structure in boiling water reactor pressure vessels and for inspecting the top guide structure for cracks or defects which avoids or overcomes the above-stated disadvantages and which does so remotely, more effectively and accurately, and without the necessity to remove any of the fuel assemblies from the reactor core.

SUMMARY OF THE INVENTION

In accordance with one aspect of the present invention, a remotely positionable and controllable underwater crawler vehicle is provided for traversing the top edges of a top guide structure of a reactor pressure vessel of a nuclear reactor, the top guide structure comprised of two sets of parallel grid members which are interconnected to form a lattice of rectangular shaped openings, a plurality of nuclear fuel assemblies each removable from and supported toward a lower end by a core support plate, the upper ends of said fuel assemblies extending into said rectangular shaped openings for lateral support in the top guide structure, said fuel assemblies having an outer channel wall extending from a lower end of the fuel assembly to an upper end of the fuel assembly terminating above the top edges of the top guide structure, the vehicle comprising a central frame, a plurality of wheels for receiving a continuous track, at least one of the plurality of wheels for rolling on the top edges of the parallel grid members of the top guide structure, mounting means for mounting the plurality of wheels to the central frame, a continuous track extending around the plurality of wheels and for engaging the top edges of the parallel grid members of the top guide structure to provide movement of said crawler system vehicle along said top edges, and a drive means secured to the central frame for rotating at least one of the plurality of wheels to cause the continuous track to move and engage the top edges of the grid members.

In accordance with another aspect of the present invention, a remotely positionable and controllable vehicle is provided for traversing the top edges of a top guide structure of a reactor pressure vessel of a nuclear reactor, the top guide structure formed by the intersection of two sets of parallel grid members having top edges and side walls, said grid members being interconnected to form a lattice of rectangular shaped openings, said vehicle comprising a central frame for supporting a plurality of wheels, a plurality of wheels having projections for maintaining a continuous track therebetween, at least one of the plurality of wheels for rolling on the top edges and engaging the side surfaces of the parallel grid members of the top guide structure, mounting means for mounting the plurality of wheels to the central frame, a continuous track extending around the plurality of wheels within the projections and for engaging the top edges of the parallel grid members of the top guide structure to provide movement of said vehicle along said top edges, and a drive system means secured to the central frame for rotating at least one of the plurality of wheels to cause the continuous track to move and engage the top edges of the grid members.

DETAILED DESCRIPTION OF THE INVENTION

Figure 1:
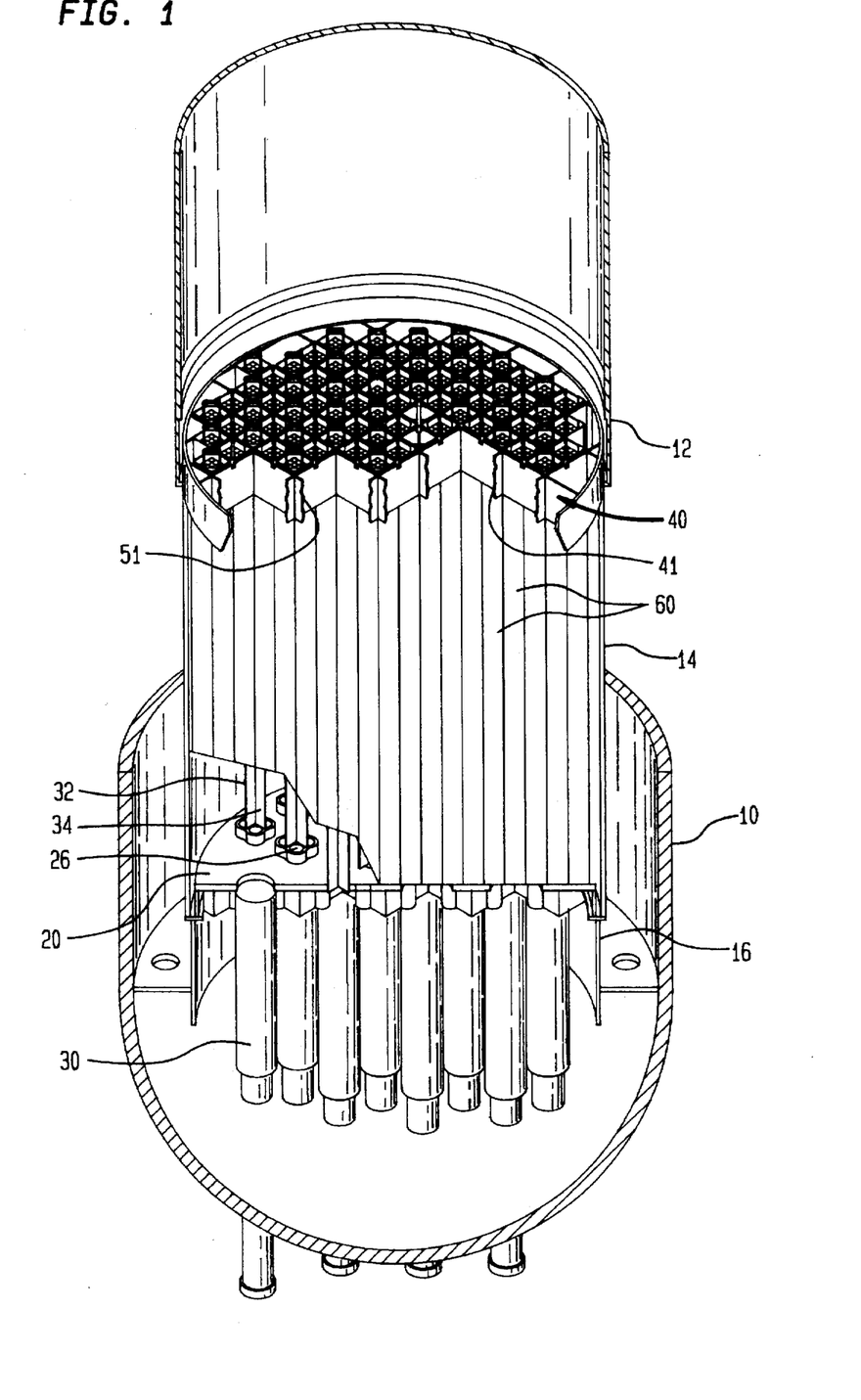
FIG. 1 is a schematic illustration of the inside of a reactor pressure vessel for a boiling water reactor (BWR) during refueling operations showing the nuclear fuel assemblies positioned in the reactor core between the core support plate and the top guide structure.
Figure 2:
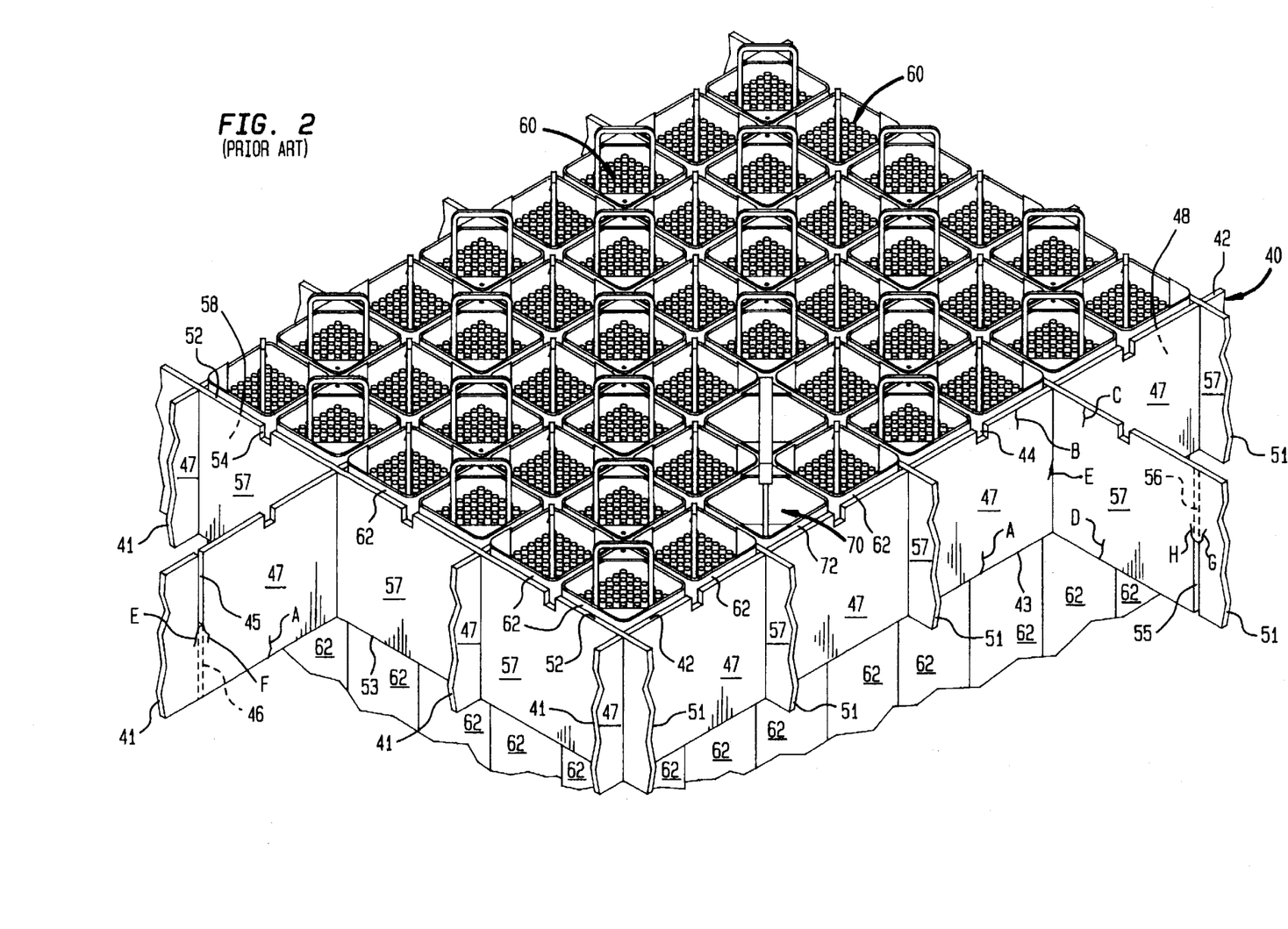
FIG. 2 is an enlarged schematic illustration of a portion of the top guide structure in FIG. 1 and showing the tops of the nuclear fuel assemblies extending into openings formed by the grid members of the top guide structure.

Referring to FIG. 1, a reactor pressure vessel 10 of a boiling water reactor is shown during shutdown and refueling operations with nuclear fuel assemblies 60 positioned underwater within the reactor core between the core support plate 20 and the top guide structure 40 and with control rods 32 which have cruciform cross-sectionally shaped blades 34 containing neutron absorbing material inserted into the gaps or spaces between fuel assemblies 60. Most of the control rods 32 have been eliminated for clarity of illustration. Referring to FIG. 2 which is an enlarged view of a portion of the top guide structure and the top portions of the nuclear fuel assemblies shown in FIG. 1, top guide structure 40 is comprised of a set of parallel grid members 41 and a second set of parallel grid members 51 which intersect to form a lattice of rectangular shaped fuel cells. The top portions of four nuclear fuel assemblies 60 and one control rod (not shown) pass through and are supported by and within each fuel cell. During refueling operations, when less than four fuel assemblies are positioned within a fuel cell in the top guide structure, a blade guide 70 is inserted in the place of the removed fuel assemblies to provide support and guidance for the control rod blades. Blade guide 70 is comprised of two dummy fuel assemblies oriented at each of their corner edges and whose handles are connected by a cross member which has a similar handle.

In accordance with the present invention, a Reactor Pressure Vessel Top Guide Structure Inspection Apparatus and Transport System 1 is provided which comprises a remotely operated and controlled powered underwater crawler vehicle 100 that rides on the top edges of two parallel grid members of the top guide structure and which uses the channel walls of fuel assemblies which extend above the top edges of the top guide structure as guides to ensure precise travel and positioning along the top guide structure. In accordance with another aspect of the present invention, underwater crawler vehicle 100 of the Reactor Pressure Vessel Top Guide Structure Inspection Apparatus and Transport System accurately maneuvers and positions an inspection system or apparatus, preferably an ultrasonic system such as an ultrasonic inspection system 200, to selected locations on the top guide structure to enable the volumetric inspection of each grid member of the top guide structure of either a fully loaded or partially loaded reactor core. None of the fuel assemblies need to be removed from the reactor core in order for the underwater crawler system to be able to traverse across and gain access to selected locations on the top of the top guide structure or for the ultrasonic inspection system to be able to volumetrically inspect the top guide structure. Similarly, if some or all of the fuel assemblies are removed from the core, whether or not the removed fuel assemblies are replaced by blade guides, the underwater crawler vehicle can traverse across the top guide structure and position an inspection system to inspect the top guide structure.

Figure 3:
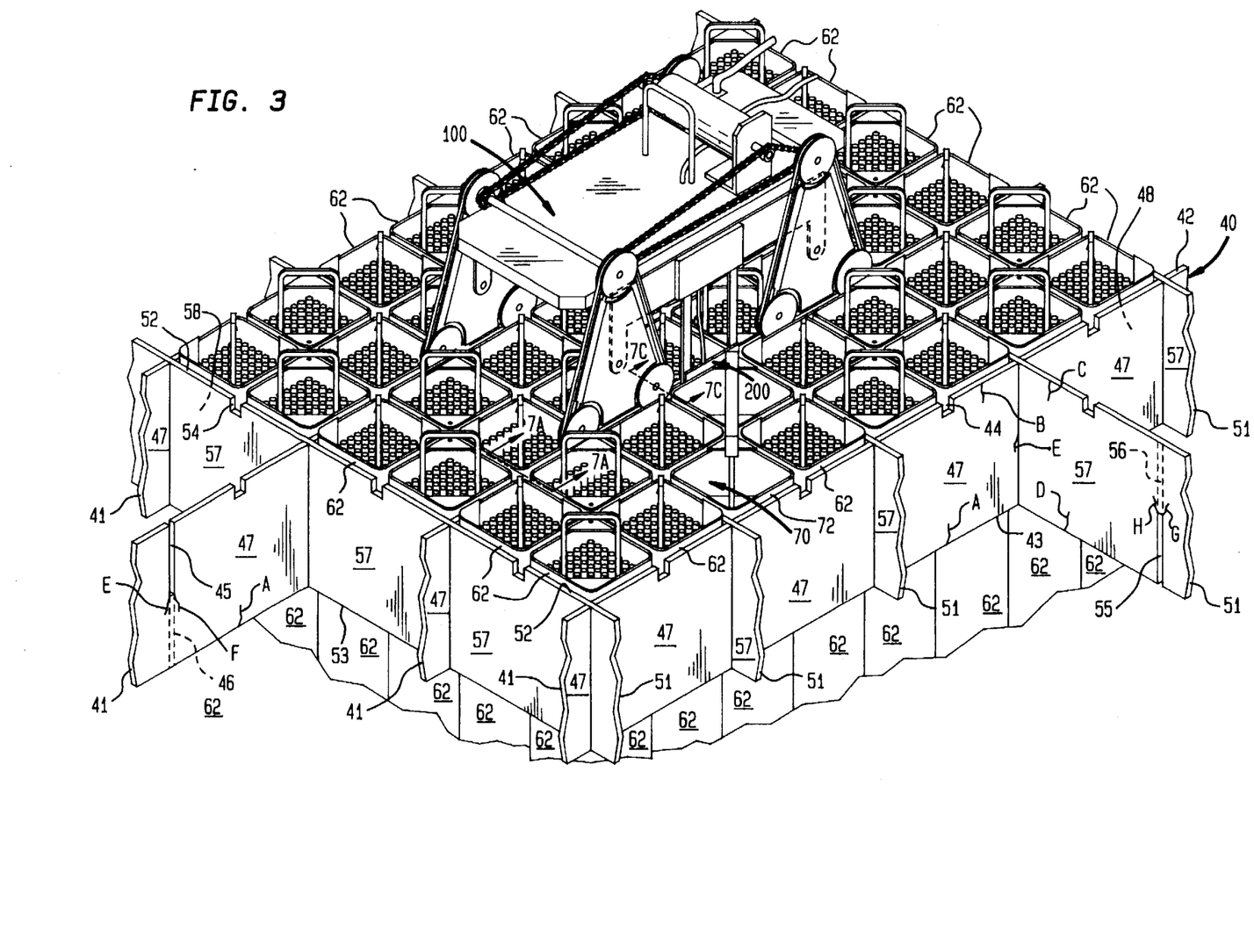
FIG. 3 is an enlarged schematic illustration of the Reactor Pressure Vessel Top Guide Structure Inspection Apparatus and Transport System positioned on top of the top guide structure shown in FIGS. 1 and 2.

Referring to FIG. 3, underwater crawler vehicle 100 with an inspection system 200 mounted thereto is shown positioned on top guide structure 40. As shown in more detail in FIG. 4A, underwater crawler vehicle 100 comprises a central frame 101 to which two bogie plates 106 are attached two to each side. Each of the four bogie plates 106 has three wheels 110, 111, 112, arranged in a triangular array and positioned by pins 113, as well as a continuous tractor type tread or track 114 extending around the three wheels to form a tread for moving underwater crawler vehicle 100 by engaging the top edges 42, 52 of top guide structure 40. The height of bogie plate 106 is chosen so that the vehicle chassis (i.e. central frame 101) will clear the topmost portion of the fuel assemblies or blade guides (i.e. the fuel assembly handling bail and the blade guide handling bail). Projecting downward from each side edge of central frame 101 is a flange 102 having two mounting struts 104 for mounting bogie plates 106. Each bogie plate 106 has a center mounting pin 108 for mounting bogie plate 106 to bogie plate mounting strut 104 and which provides a center pivot point and permits compliance and proper alignment of the track 114 with top edges 42, 52 of the top guide structure.

Figure 4A:
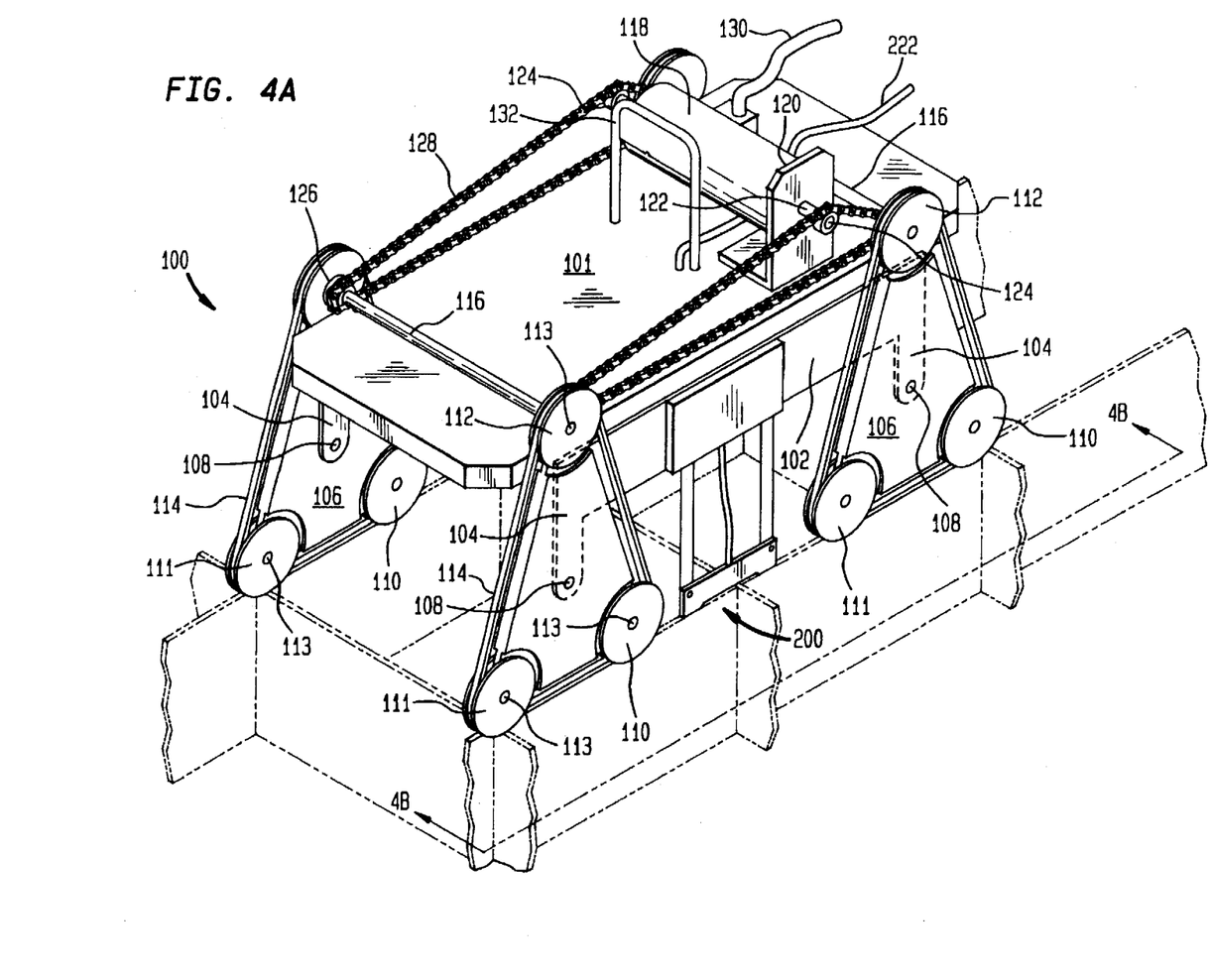
FIG. 4A is an isolated perspective view of the Reactor Pressure Vessel Top Guide Structure Inspection Apparatus and Transport System shown in FIG. 3.

The drive system comprises a reversible direct current motor 118 which provides the motive power to drive the four tracks 114 on two parallel grid members (41 or 51) causing movement along the top guide structure. Motor 118 is mounted to frame 101 by mounting flange 120 to drive shaft 122 each end of which is fitted with a motor sprocket 124. Power is transferred from motor 118 to enable the movement of underwater crawler vehicle 100 by two continuous chain drives 128 each of which is engaged and driven by motor sprocket 124. Each continuous chain drive 128 engages a sprocket 126 mounted on each end of shaft 116 connecting the top wheel 112 of each parallel bogie plate 106. When motor 118 is energized via cable 130, sprockets 124 which are rotated by motor 118 engage chains 128 and rotate sprockets 126 which in turn cause each top wheel 112 of each bogie plate 106 to rotate thereby enabling each track 114 to be driven synchronously, at variable speed, and in either a forward or a reverse direction. Motor 118 is equipped with a magnetic position encoder which transmits position information to a control console for remote operation of the underwater crawler vehicle and for correlating inspection data with the particular location of the inspection on the top grid structure.

Underwater crawler vehicle 100 is lifted by bail handle 132 by a fuel handling machine (not shown) and is placed on top edge 42 (or 52) of parallel grid members 41 (or 51). The fuel handling machine grasps the bail handle 132 of underwater crawler vehicle 100 and positions it to the starting point for the inspection, typically at the periphery of the top guide structure. Referring to FIG. 3, underwater crawler vehicle 100 is shown positioned on top edges 42 of two adjacent parallel grid members 41. Once the underwater crawler vehicle reaches the opposite end of the span of the grid members of top guide structure, the fuel handling machine is used to grasp bail handle 132 to lift underwater crawler vehicle and position it on the next span of parallel grid members. Since the underwater crawler vehicle has a reversible DC motor which propels it in either a forward or a reverse direction, the underwater crawler vehicle can be rotated 180° prior to positioning on the next span of parallel grid members, or driven in reverse on the next span. After the underwater crawler vehicle is positioned and released, the fuel handling machine is free to move fuel or perform other duties. This procedure is repeated until each span of grid members of the top guide structure is traversed.

Figure 7A:
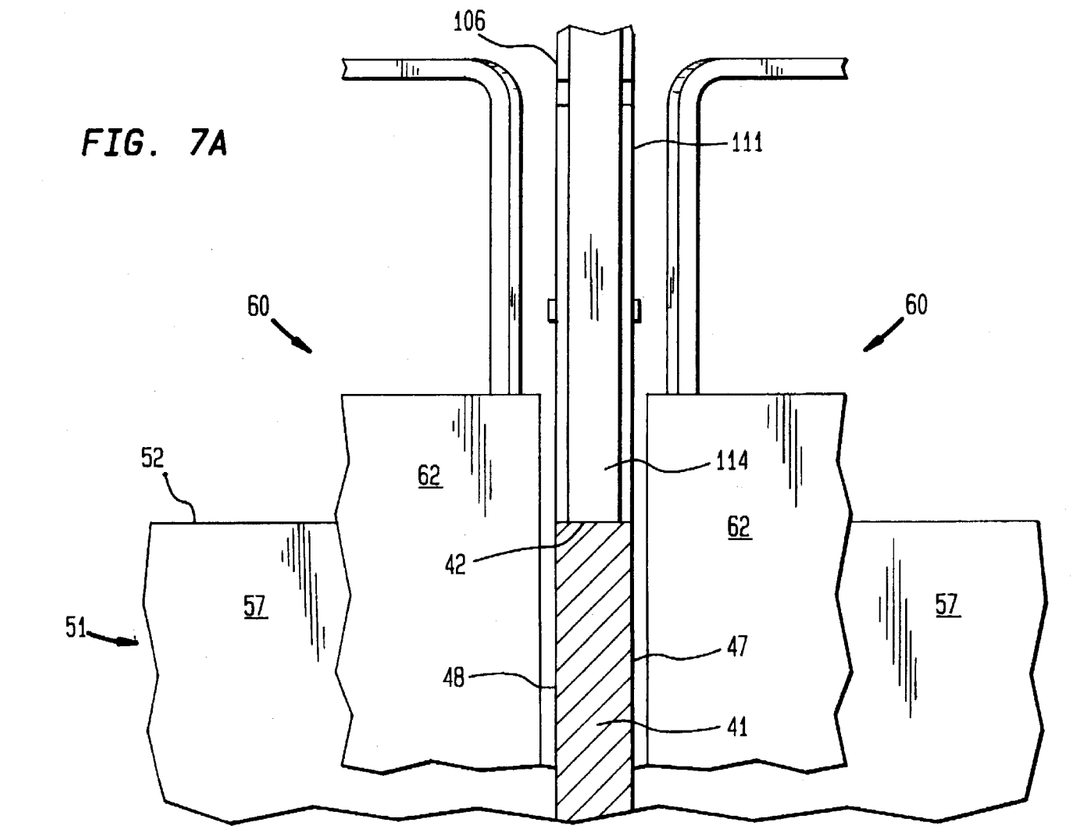
FIG. 7A is an enlarged view of one of the bottom wheels and track of the Reactor Pressure Vessel Top Guide Structure Inspection Apparatus and Transport System taken along line 7A—7A in FIG. 3 as it sits upon the top grid structure and between the outer channel walls of adjacent nuclear fuel assemblies.
Figure 7B:
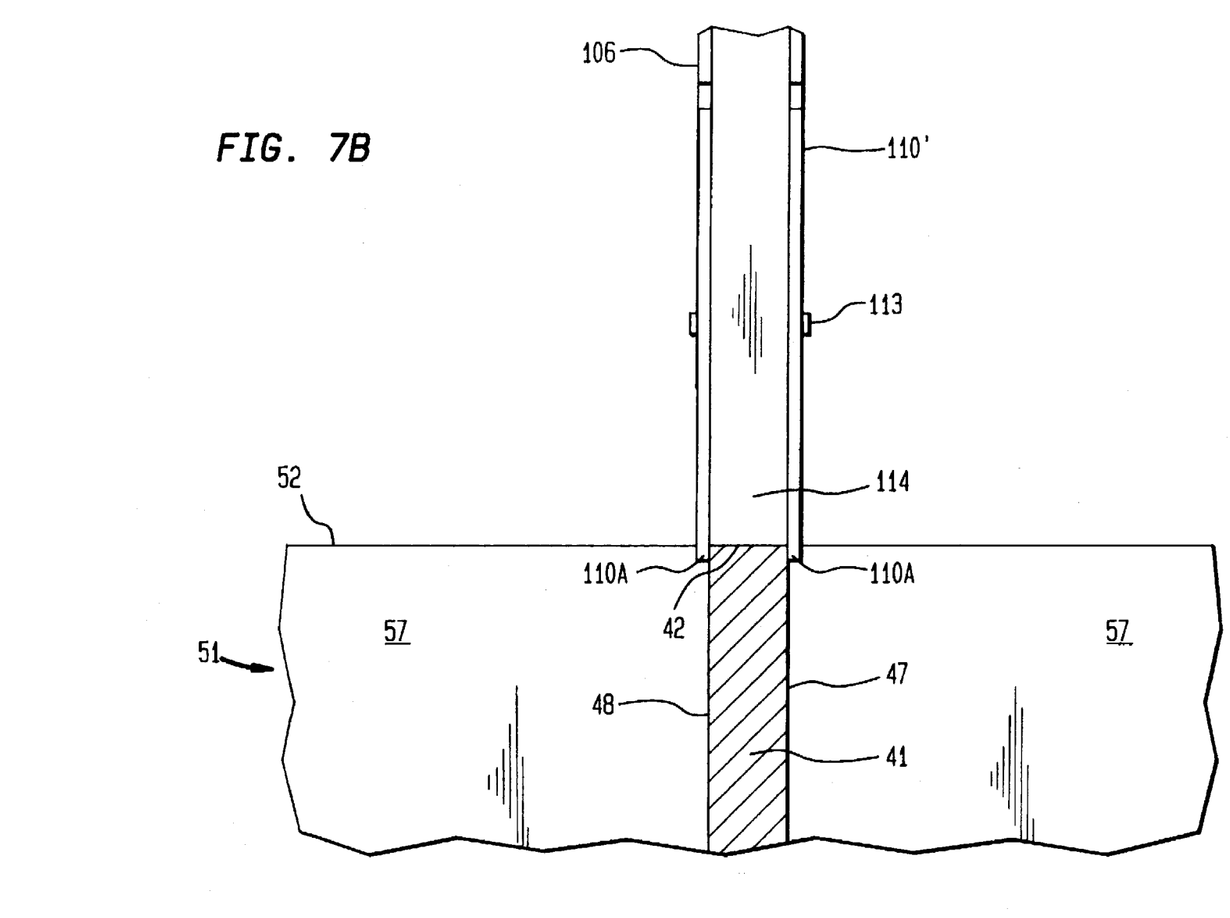
FIG. 7B is an enlarged view of one of the bottom wheels and track of an alternative embodiment of the present invention as it sits upon the top grid structure with the fuel assemblies unloaded from the reactor core.
Figure 7C:
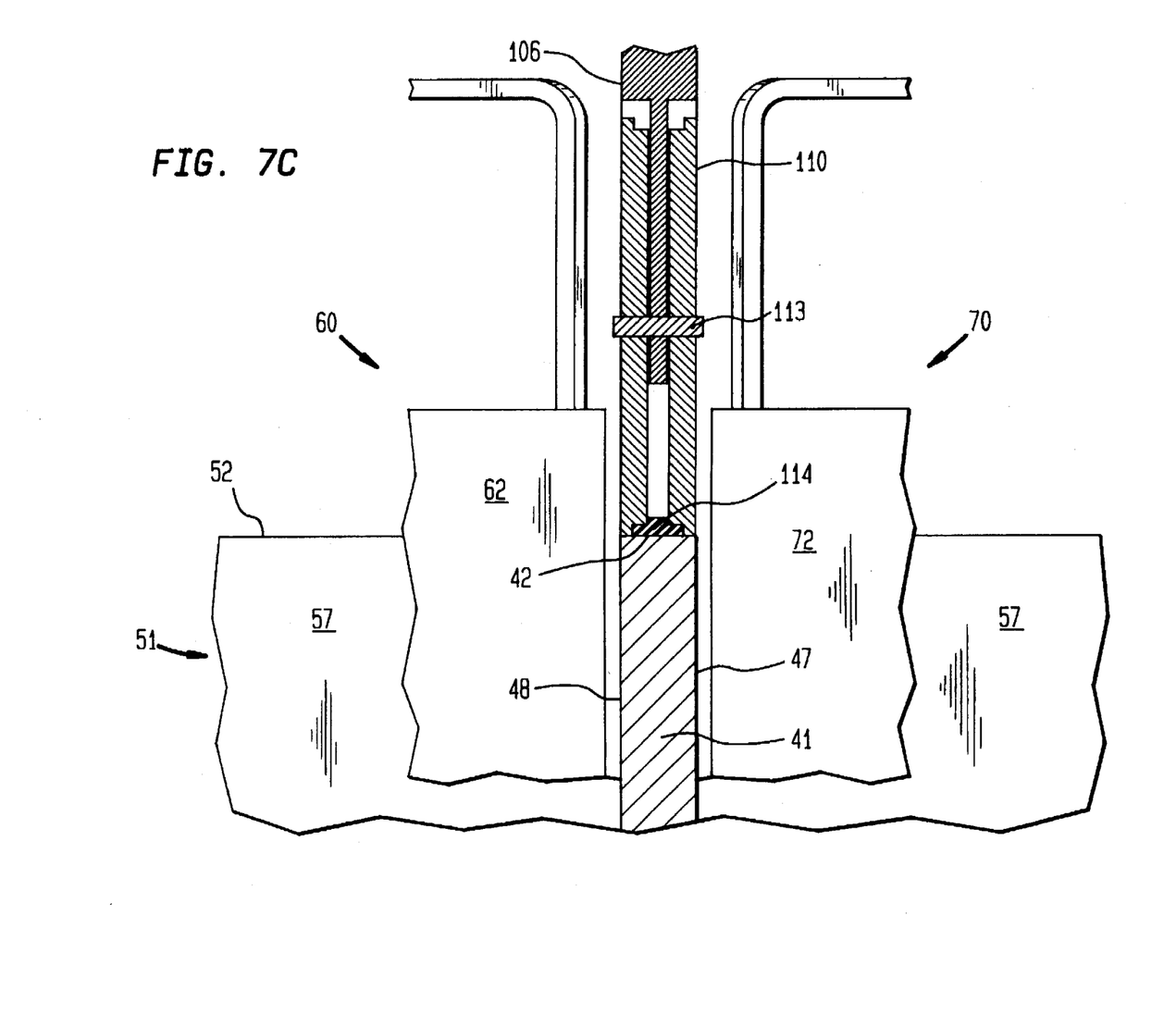
FIG. 7C is an enlarged sectional view taken along line 7C—7C in FIG. 3 of one of the bottom wheels and track as it sits upon the top grid structure and between an outer channel wall of one nuclear fuel assembly and an outer wall of an adjacent dummy fuel assembly or blade guide.

Referring to FIG. 7A which is an enlarged view, partly in section, taken along line 7A—7A in FIG. 3, track 114 on wheel 111 is shown positioned on top edge 42 of grid member 41 between channel walls 62 of adjacent fuel assemblies 60. As underwater crawler vehicle 100 is driven along the top edge 42 of the top guide structure, wheel 111 is guided by outer channel walls 62 of adjacent fuel assemblies. By having track 114 travel within a recess within each wheel, and by having the wheels ride on the top edge of the top grid structure between the channel walls 62 of adjacent fuel assemblies 60, the possibility of misalignment of track 114 from top edge 42 of the top guide structure is eliminated. In the event that blade guides 70 are inserted into the core in place of any of the fuel assemblies that may have been removed (FIG. 3), then outer walls 72 of blade guide 70 function in the same way as outer channel walls 62 of fuel assembly 60 to guide wheels 110, 111 and similarly limit any potential misalignment of track 114 relative to the top edge 42 of the top guide structure (FIG. 7C). If the nuclear fuel assemblies are removed from the core and are not replaced by blade guides, then a modified wheel 110' can be provided having extended projections 110A within which tread 114 is positioned and maintained (FIG. 7B). Unlike wheels 110, 111 projections 110A of modified wheel 110' extend below top edge 42 and engage the side surfaces 47 and 48 of grid member 41 which thereby prohibit misalignment of wheel 110' from the grid member. Thus, underwater crawler vehicle 100 can traverse across the top edges of top guide structure 40 if some, none, or all of the nuclear fuel assemblies or blade guides are removed from the core.

As stated previously, areas of the top guide structure which are inaccessible to visual examination have frequently gone uninspected. It is an advantage to use the underwater crawler vehicle to transport and position instrumentation or measuring devices to areas of the top guide structure which are inaccessible to visual examination. It is a further advantage to use the underwater crawler vehicle to gain access to those areas which although accessible to visual examination, are either unsuited to such an examination, or the subject of examination can't be visually identified. Of particular interest is the need to inspect the top guide structure of a fully or partially loaded BWR core of nuclear fuel assemblies for irradiated assisted stress corrosion cracking and intergranular stress corrosion cracking. In accordance with the present invention, the underwater crawler vehicle is equipped with an inspection system which can perform the required inspection for such cracking remotely, more effectively and accurately, and without the need to remove the fuel assemblies from the reactor core.

Figure 4B:
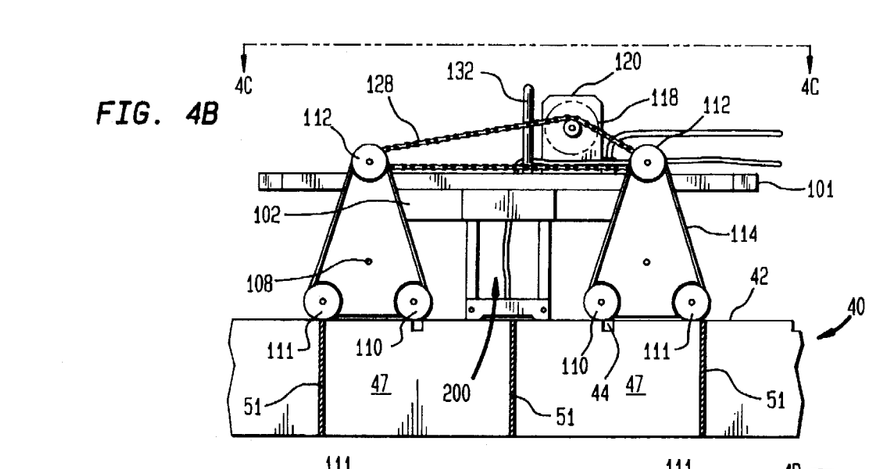
FIG. 4B is a side view of the Reactor Pressure Vessel Top Guide Structure Inspection Apparatus and Transport System shown positioned on the top guide structure in FIG. 3 taken along line 4B—4B.
Figure 4C:
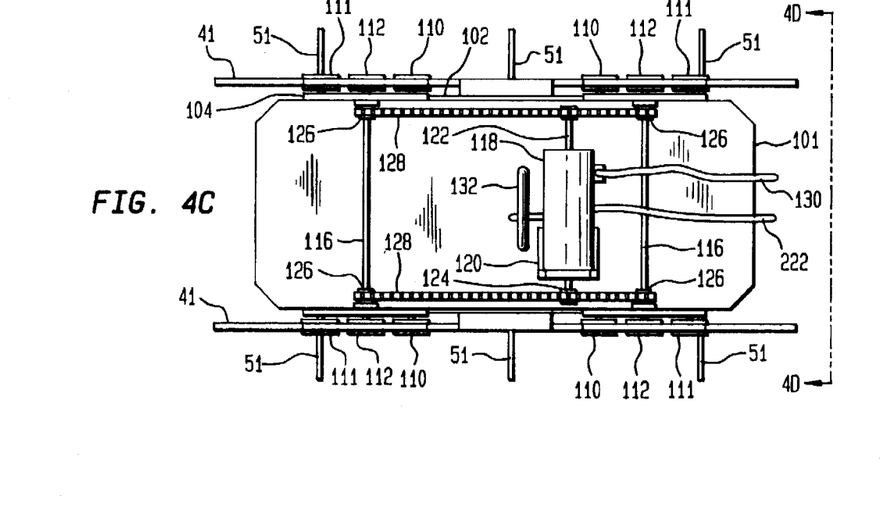
FIG. 4C is a top view of the Reactor Pressure Vessel Top Guide Structure Inspection Apparatus and Transport System shown in FIG. 4B taken along line 4C—4C.
Figure 4D:
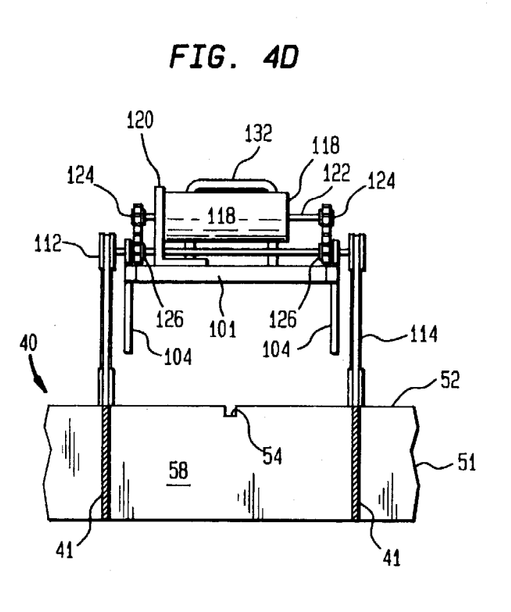
FIG. 4D is an end view of the Reactor Pressure Vessel Top Guide Structure Inspection Apparatus and Transport System shown in FIG. 4C taken along line 4D—4D.
Figure 5:
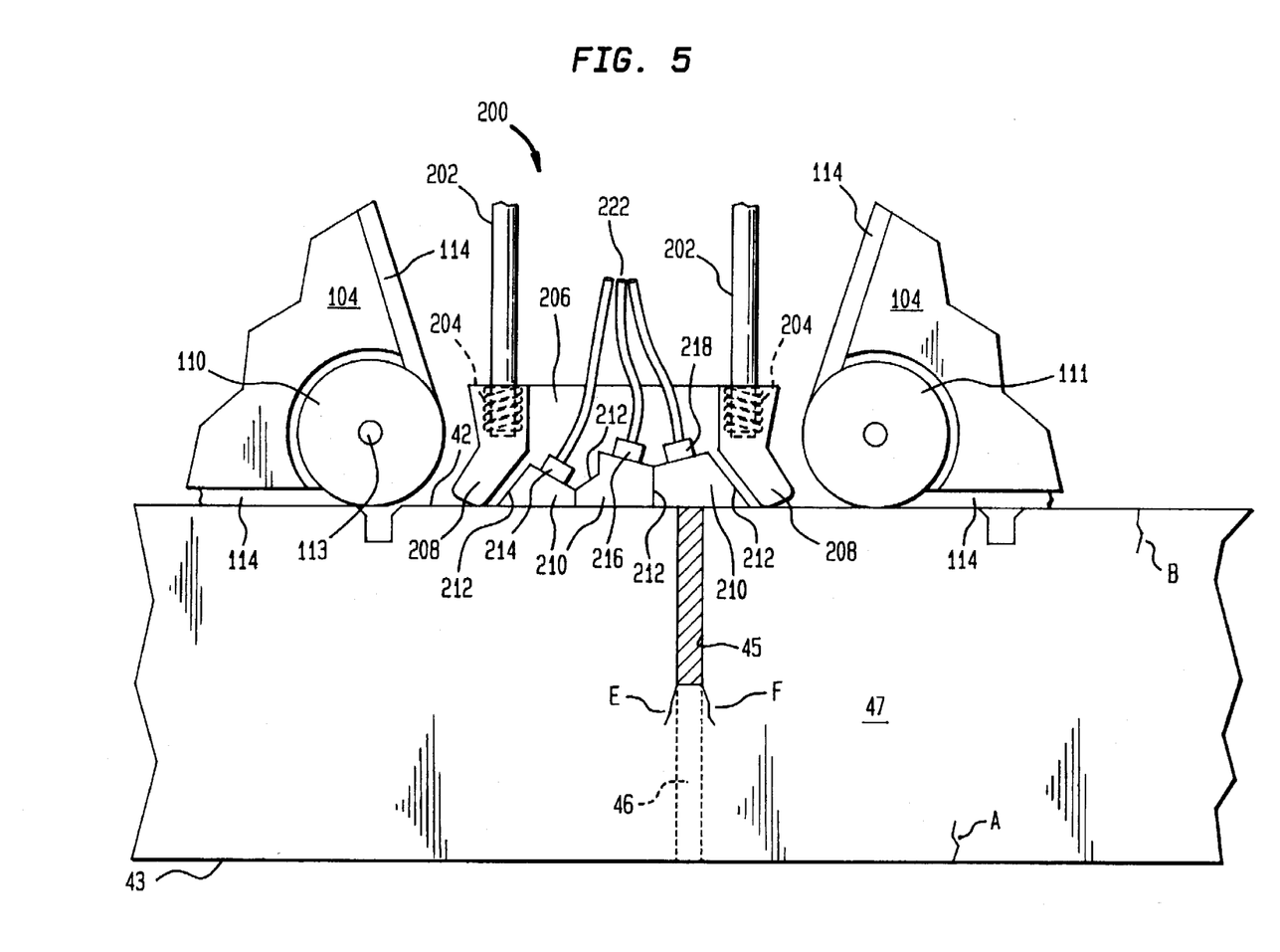
FIG. 5 is an enlarged side view of the ultrasonic inspection apparatus of the Reactor Pressure Vessel Top Guide Structure Inspection Apparatus and Transport System shown in FIGS. 3–4 for the inspection of the top guide structure.

Referring generally to FIGS. 3, 4A, 4B and particularly to FIG. 5, Inspection System 200 comprises two integrated transducer packages one of which is located on each side of underwater crawler vehicle between each of the two bogie plates. Each package includes three integrated ultrasonic transducers, two focused angle beam or shear wave transducers (216, 218) and positioned to face in opposite directions (216 facing forward 30° from normal to the top edge of the grid structure and 218 facing rearward 30° from normal to the top edge of the grid structure) and a creeping wave transducer 214. Defects in grid members 41 (or 51) are typically: (a) cracks extending from the top and bottom edges 42, 43 (or 52, 53) and illustrated in FIGS. 2, 3, and 5 by lines A, B, C, and D; as well as (b) cracks extending from the corners of notches 45 (or 55) and similarly illustrated in FIGS. 2, 3 and 5 by lines E, F, G, and H. Creeping wave transducer 214 generates an ultrasonic signal that penetrates and inspects the material volume of grid members 41 (or 51) close to top edge 42 (or 52) identifying defects in these surfaces. Shear wave transducers 216 and 218 each introduces an ultrasonic signal into members 41 (or 51) at a 30° angle as discussed above which has been determined to provide to optimum volumetric inspection coverage. The ultrasonic signals introduced into top edges 42 (or 52) travel through the grid member and detect defects on the bottom edges 43 (or 53), as well as the notch area 45. As the underwater crawler vehicle is advanced, the ultrasonic signal is partially blocked from inspecting the bottom edge of the grid member by notch 45 (or 55 depending on the orientation of the crawler). Inspection coverage of this partially blocked area is provided by the rearward facing transducer 218 after the underwater crawler system has advanced sufficiently past the notch providing for 100% inspection of bottom edges 43 (or 53). Additionally, the ultrasonic signals from transducers 216 and 218 are reflected from the bottom edge 43 (or 53) at the same incidence angle enabling inspection of notch area 55. Inspection of the notch areas is of particular importance since these areas are inaccessible when the fuel assemblies are in the reactor. Even if the fuel assemblies have been removed, cracks in these areas cannot normally be detected by prior art devices because such cracks are typically obscured by the notch of the complementary grid member of the top guide structure. The number, types, and positioning of the transducers in Inspection System 200 on the Underwater Crawler Vehicle 100 enables more than 95% full volumetric inspection of the top guide structure without having to remove any fuel assembly from the core.

Each integrated transducer package includes a mounting plate 206 which is attached to flange 102 of underwater crawler system 100 by two rods 202 each of which is spring loaded 204 to maintain the transducer package in contact with and a fixed distance from the top edge of the grid member and thereby ensure sound coupling into the grid member. At the front and rear of mounting plate 206 are curved lead-in shoes 208 that prevent the transducer package from catching as it passes across possibly uneven surfaces such as the intersection of grid members 41 and 51, or alignment notches 44, 54 in the top edges of the top guide structure. Ultrasonic transducers 214, 216, 218 are mounted to a common delay line block 210 which permits installation of the transducers. Each section of delay line block 210 has an acoustic barrier 212 to ultrasonically isolate each transducer.

Figure 6:
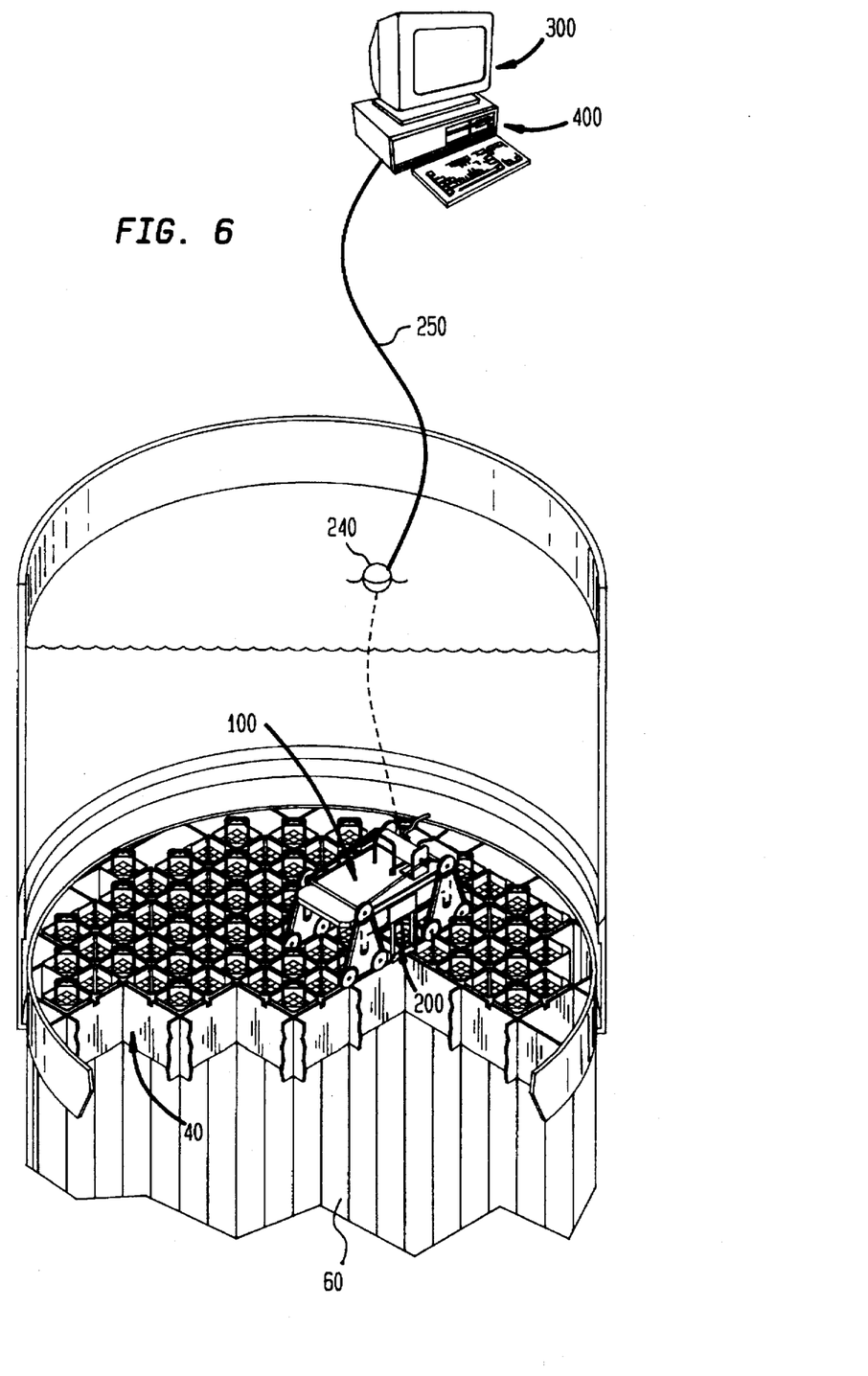
FIG. 6 is a schematic of the Reactor Pressure Vessel Top Guide Structure Inspection Apparatus and Transport System shown in FIGS. 3–5 and a data acquisition unit and a control unit for collecting inspection results and for controlling the movement of the Reactor Pressure Vessel Top Guide Structure Inspection Apparatus and Transport System.

Control, operation, and data acquisition and storage from and to the underwater crawler vehicle 100 and/or inspection system 200 is performed from Control Console 400 utilizing a conventional computer based multichannel ultrasonic electronics system and a Data Acquisition Unit 300 which are connected via a cable bundle 250 comprised of transducer cables 222, motor cables 130 and television camera cable (not shown). Cable bundle 250 is supported by a buoyance device 240 which floats on the surface of the water in the reactor vessel and prevents extraneous forces from moving the underwater crawler vehicle.

Figure 8:
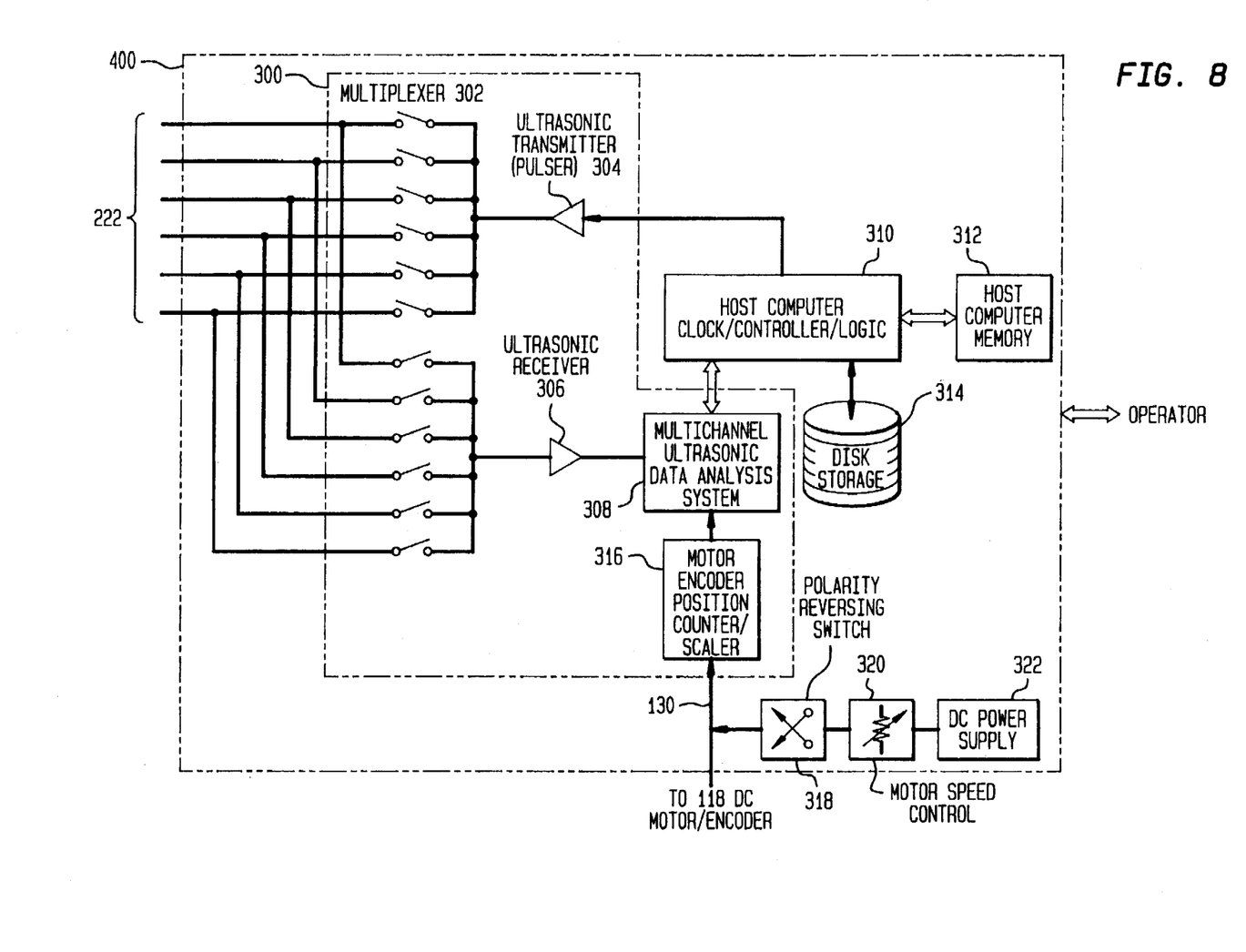
FIG. 8 is a block diagram of the data acquisition and control circuits.

Referring to FIG. 8, direct current motor 118 is energized by a direct current voltage generated by DC power supply 322. The voltage level supplied to motor 118 is varied by a speed control 320, providing the underwater crawler vehicle with an infinitely variable speed range within the maximum output voltage of the power supply. Forward and reverse direction of the underwater crawler system is provided by a polarity reversing switch 318. As the underwater crawler vehicle travels along the grid members 41 (or 51) of the top guide structure, a computer 310 provides timing and control signals to a transmitter and receiver multiplexer 302 causing ultrasonic transducers 214, 216 and 218 on each side of the underwater crawler system to operate sequentially via cables 222. The return ultrasonic signal from a transducer containing inspection information is routed to a receiver 306 for initial processing. The processed signal is fed to a data analysis system 308 for further data processing and defect identification. In the data analysis system, position information from the motor position counter/scaler 316 is added to the ultrasonic data to provide physical position information of each defect. The complete data set from the transducer is then sent to computer 310 for short term storage in memory 312 or in long term disk storage 314. After computer 310 has stored the data, the clock/control/timing section of computer 310 indexes multiplexer 302 to the next transducer, and the data acquisition sequence is repeated. Computer 310 will index the multiplexer through all ultrasonic transducers in a continuous looping fashion at a rate in excess of 1 kHz.

While the present invention has been particularly shown and described with reference to preferred embodiments thereof, it will be understood by those skilled in the art that various changes in form and details may be made therein without departing from the spirit and scope of the invention.

We claim:

1. A remotely positionable and controllable underwater crawler vehicle for traversing the top edges of a top guide structure of a reactor pressure vessel of a nuclear reactor, the top guide structure comprised of two sets of parallel grid members which are interconnected to form a lattice of rectangular shaped openings, a plurality of nuclear fuel assemblies each removable from and supported toward a lower end by a core support plate, the upper ends of said fuel assemblies extending into said rectangular shaped openings for lateral support in the top guide structure, said fuel assemblies having an outer channel wall extending from a lower end of the fuel assembly to an upper end of the fuel assembly terminating above the top edges of the top guide structure, said vehicle comprising:

a central frame for supporting a plurality of wheels;

a plurality of wheels for receiving a continuous track, at least one of the plurality of wheels for rolling on the top edges of the parallel grid members of the top guide structure;

mounting means for mounting the plurality of wheels to the central frame;

a continuous track extending around the plurality of wheels and for engaging the top edges of the parallel grid members of the top guide structure to provide movement of said crawler system vehicle along said top edges; and a drive means secured to the central frame for rotating at least one of the plurality of wheels to cause the continuous track to move and engage the top edges of the grid members.

2. The vehicle as in claim 1 further including an inspection instrument.

3. The vehicle as in claim 2 wherein the inspection instrument includes an ultrasonic inspection system for ultrasonically inspecting the top guide structure.

4. The vehicle as in claim 3 wherein the plurality of wheels are at least six wheels and three wheels are positioned on each of two opposite sides of the central frame and arranged in a triangular array.

5. The vehicle as in claim 4 wherein at least one wheel on each of the two opposite sides of the central frame has a recess within which the continuous track is retained.

6. The vehicle as in claim 5 wherein the mounting means includes a flange secured on each side of the central frame, said flange having a mounting strut, the mounting means further including a bogie plate on each side of the central frame to which each of the three wheels are positioned in the triangular array.

7. The vehicle as in claim 6 wherein the drive means comprises a direct current motor mounted to the central frame and a continuous chain drive which is engageable by the motor for rotating at least one of the plurality of wheels to thereby rotate and causing the continuous track to move and engage the top edges of the grid members.

8. The vehicle as in claim 7 wherein the ultrasonic inspection system comprises a shear wave transducer.

9. The vehicle as in claim 8 wherein the ultrasonic inspection system further comprises a creeping wave transducer.

10. The vehicle as in claim 9 wherein the shear wave transducer is at least two shear wave transducers, one of the at least two shear wave transducers positioned on the vehicle to face in a first direction about 30° from normal to the top edge of the top guide structure and a second of the at least two shear wave transducers positioned on the vehicle to face in a second direction about 30° from normal to the top edge of the top guide structure.

11. The vehicle as in claim 10 further including a position encoder for transmitting position information with respect to a location of the top guide structure.

12. A remotely positionable and controllable vehicle for traversing the top edges of a top guide structure of a reactor pressure vessel of a nuclear reactor, the top guide structure formed by the intersection of two sets of parallel grid members having top edges and side walls, said grid members being interconnected to form a lattice of rectangular shaped openings, said vehicle comprising:

a central frame for supporting a plurality of wheels;

a plurality of wheels having projections for maintaining a continuous track therebetween, at least one of the plurality of wheels for rolling on the top edges and engaging the side walls of the parallel grid members of the top guide structure;

mounting means for mounting the plurality of wheels to the central frame;

a continuous track extending around the plurality of wheels within the projections and for engaging the top edges of the parallel grid members of the top guide structure to provide movement of said vehicle along said top edges; and a drive system means secured to the central frame for rotating at least one of the plurality of wheels to cause the continuous track to move and engage the top edges of the grid members.

13. The vehicle as in claim 12 further including an inspection instrument for inspecting a portion of the reactor pressure vessel.

14. The vehicle as in claim 13 wherein the inspection instrument includes an ultrasonic inspection system for ultrasonic inspection of the top guide structure.

15. The vehicle system as in claim 14 wherein the plurality of wheels are at least six wheels where three wheels are positioned on each of two opposite sides of the central frame and arranged in a triangular array.

16. The vehicle as in claim 15 wherein the mounting means includes a flange secured on each side of the central frame, said flange having a mounting strut, the mounting means further including a plate on each side of the central frame to which each of the three wheels are positioned in the triangular array.

17. The vehicle as in claim 16 wherein the drive system means comprises a direct current motor mounted to the central frame and a continuous chain drive which is engageable by the motor for rotating at least one of the plurality of wheels to rotate and causing the continuous track to move and engage the top edges of the grid members.

18. The vehicle as in claim 17 wherein the ultrasonic inspection system comprises a shear wave transducer.

19. The vehicle as in claim 18 wherein the ultrasonic inspection system further comprises a creeping wave transducer.

20. The vehicle as in claim 19 wherein the shear wave transducer is at least two shear wave transducers, one of the at least two shear wave transducers positioned on the vehicle to face in a first direction about 30° from normal to the top edge of the top guide structure and a second of the at least two shear wave transducers positioned on the vehicle to face in a second direction about 30° from normal to the top edge of the top guide structure.

21. The vehicle as in claim 20 further including a position encoder for transmitting position information with respect to a location of the top guide structure.

* * * * *